June 1, 1971     A. W. ELMES     3,582,289
CATALYTIC REACTORS
Filed Dec. 2, 1968
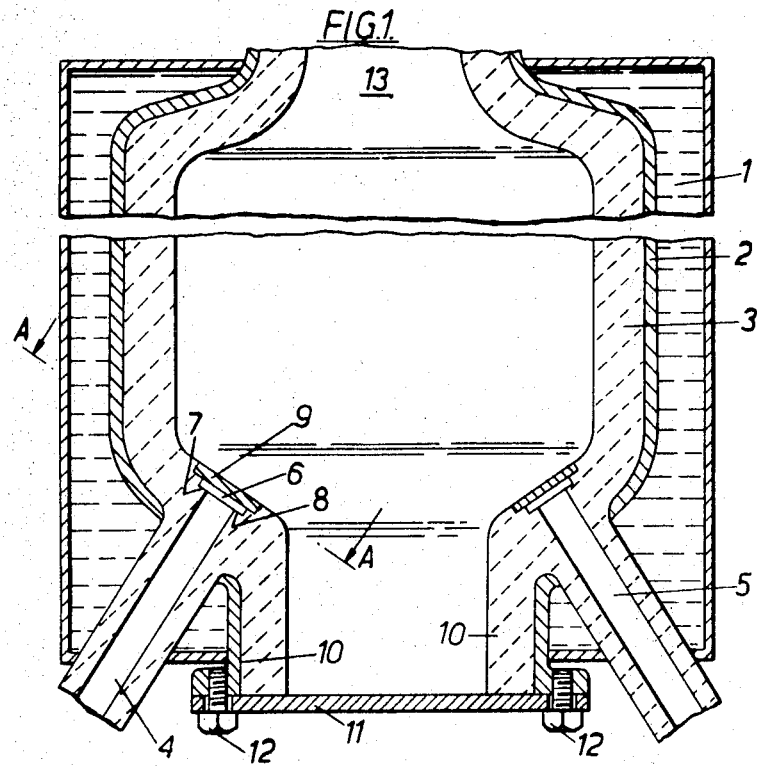
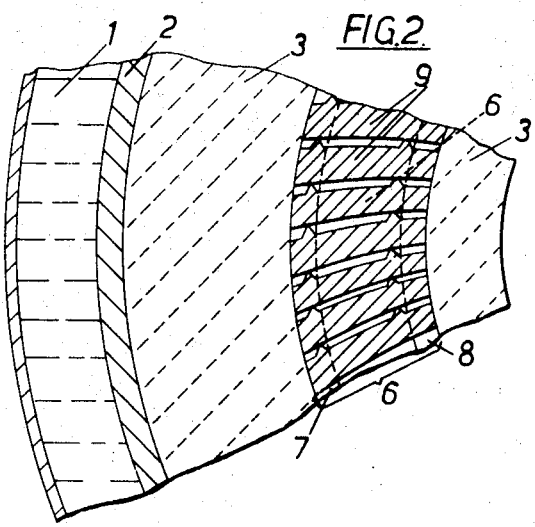
Inventor
ALBERT WALTER ELMES
By Cushman, Darby & Cushman
Attorneys United States Patent Office 3,582,289
Patented June 1, 1971

3,582,289
CATALYTIC REACTORS
Albert Walter Elmes, Norton-on-Tees, England, assignor to Imperial Chemical Industries Limited, London, England
Filed Dec. 2, 1968, Ser. No. 780,478
Claims priority, application Great Britain, Dec. 8, 1967, 55,966/67
Int. Cl. B01j 9/04
U.S. Cl. 23—288R                                    6 Claims

ABSTRACT OF THE DISCLOSURE

A chemical reactor has its catalyst discharge at the bottom with a gas port at the top and circumferential gas ports at the bottom of the reactor but above the catalyst discharge. Preferably the reactor has an inner refractory lining and outer cooling jacket and gas ports made up of a circumferential channel in the refractory lining at the bottom of the reactor, provided with means to introduce or remove a gas at one or more points. This channel is covered by a gas permeable cover.

---

The present invention relates to a novel chemical reactor, particularly to a reactor suitable for use in the petrochemical industry, and to processes using such a reactor.

Many processes in the chemical industry involve the reaction of gases on a solid catalyst. The catalyst for such processes may be in the form of a bed of granules contained in a vertically positioned reactor the gaseous reactants being passed via gas ports into the top or bottom of the reactor and the products, also often in gaseous form, being removed from the bottom or top of the reactor respectively. As such processes are mostly conducted at elevated temperatures and pressures it is necessary, if a conventional steel reactor is to be used, to protect the shell by providing an internal refractory lining of a heat-resistant material e.g. a ceramic or heat-resistant concrete. The use of an internal lining is not without associated disadvantages however. Cracks in the lining may allow the passage of hot gases into contact with the outer metal shell causing the latter to overheat. Heating of the shell results in uneven expansion of the shell with respect to the lining tending to open a gap between the two, aggravating the problem. One method of overcoming this difficulty, particularly in the petrochemical industry, has been to provide a metal sheath inside the refractory lining so that gases cannot pass through the lining into contact with the shell. The use of such a sheath however presents considerable difficulties in designing effective means for gas entry and removal and for catalyst removal. The gas port at the bottom of the reactor is usually located on the longitudinal axis of the reactor, a guard device such as a mesh or perforated plate being provided to prevent escape of catalyst into this port. With a gas port in this position the discharge point for the catalyst must normally be situated on the side of the reactor and is usually located in the lower part of the reactor shell which is generally convergent in shape. The chief disadvantage of this design is that catalyst removal is difficult from a discharge point in the side of the reactor because the catalyst tends to run out of the discharge point and to leave a slope of catalyst inclining from the discharge point to the opposite wall of the reactor. When this condition is reached it is necessary to resort to manual means to empty the reactor and with larger reactors it is often necessary for workmen to enter the reactor to clear the spent catalyst. A reactor constructed in accordance with the present invention provides an improved method of catalyst removal and an alternative means of introducing gas or removing product.

According to the invention a reactor suitable for use in the petrochemical industry and adapted to contain a solid catalyst comprises a convergent lower part, means at the bottom of the reactor for discharging catalyst, a gas port at the top of the reactor and a series of gas ports disposed around the circumference of the convergent lower part of the reactor said gas ports being located above said catalyst discharge means.

Preferably the reactor comprises an inner refractory lining and an outer jacket adapted to contain a liquid coolant.

The catalyst discharge means is preferably located on the longitudinal axis of the reactor and has advantageously substantially the same cross-sectional area as the bottom of the reactor to which it is attached. The inlet and exit gas ports are usually spaced apart along the length of the reactor at the top and bottom so that the reactant gases pass through the length of the catalyst bed before the products are withdrawn.

The reactor is usually cylindrical in shape with convergent lower portion and preferably convergent upper portion. The invention is particularly suitable for large reactors e.g. reactors having a cross-sectional diameter of 5 to 50 feet. The reactor is of value for carrying out high temperature reactions at elevated pressure, e.g. a temperature of 200° C. to 1200° C. and a pressure of 10 to 100 atmospheres. The presence of a liquid coolant, which is preferably water, in the outer jacket is of advantage in that it maintains the reactor shell at a relatively low temperature, minimising the effect of any hot gases coming into contact with the shell. A reactor constructed in accordance with the present invention also facilitates the use of a preferred method of gas distribution as hereinafter described.

The particularly effective form of gas introduction or removal which is used in the reactor of the present invention is through a series of ports disposed around the circumference of the convergent lower part of the reactor. By this means when the lower ports are used for gas introduction the reactant gases are fed evenly to the catalyst and the possibility of the gases channeling a fixed path through the catalyst bed is reduced. When the inside of the reactor is lined with a refractory lining the circumferential distribution of the inlet gas can be inexpensively and effectively arranged by forming a channel in the refractory lining extending wholly or partly around the internal circumference of the reactor, the gas being introduced into the channel at one or more points and by circulating around the channel effecting the desired circumferential distribution to the catalyst. Similarly the gaseous reaction products may readily be collected in such a channel when the lower gas ports are used to remove the reaction product. To prevent ingress of catalyst to the channel it is desirable to provide a cover, permeable to gas, over the latter. This is conveniently effected by forming shoulders inside the channel on which rest transversely a number of interlocking fire-resistant bars. As described above the partial or total circumferential distribution of the gas is particularly readily effected when the refractory lining is in contact with the catalyst. This in turn is facilitated by cooling the outer reactor shell as described to minimise the adverse effects of hot gases percolating through cracks in the lining. The alternative method of preventing the hot gases passing through the refractory lining by covering the internal surface of the latter with metal sheet is much less readily adaptable to the inexpensive and efficient method of gas distribution through a circumferential channel as described above.

The catalyst discharge means may comprise an extension piece formed integral with or attached to the bottom of the reactor. The extension piece is closed by suitable means such as a bolted cover plate. The portion of the reactor between the lower gas ports and the point of catalyst discharge is dead space in which little or no reaction occurs. If the catalyst is relatively inexpensive this dead space may conveniently be filled with catalyst, however if the catalyst is expensive the dead space may be filled with inert packing e.g., ceramic balls or rings.

The gas port at the top of the reactor is suitably positioned on the longitudinal axis of the reactor and has preferably the same internal cross-sectional area as the cross-sectional area of the reactor at the point of junction. Usually the top of reactor converges to form a truncated cone, the gas port being preferably located at the apex of the cone.

The invention will now be further described with reference to the attached diagrams in which FIG. 1 is a longitudinal section through the reactor. FIG. 2 is a section through the reactor along the line A—A in FIG. 1.

The reactor comprises an outer water jacket 1, a steel shell 2 and inner ceramic lining 3. Two gas pipes 4 and 5 pass through the reactor wall terminating in a circumferential channel 6 formed in the ceramic lining. The channel is formed with shoulders 7 and 8 on which rest a number of interlocking fire-resistant bars 9. An extension piece 10 formed integral with the reactor and provided with a cover plate 11 held in position by bolts 12 provides the catalyst discharge means. The gas port 13 is an extension of the top of the reactor.

In operation the reactor is filled with ceramic balls from the catalyst discharge point up to the channel 6. The remainder of the reactor contains the catalyst granules prevented from entering the channel 6 by the fire-resistant bars 9. Reactant gas introduced through the inlet gas pipes 4 and 5 circulates round the channel 6 and is distributed into the catalyst bed. Product gases leaving the catalyst bed are removed through the exit port 13. To discharge the catalyst the cover plate 11 is removed by disengaging the retaining bolts 12 wherein the catalyst and ceramic balls fall through and may be removed. If desired the functions of the gas ports may be reversed, port 13 being the gas inlet port and pipes 4 and 5 providing the gas exit means.

The reactor of the present invention is particularly useful in a process for the de-alkylation of alkyl benzenes to yield benzene. In such a process a gaseous mixture of hydrogen and alkylbenzenes such as toluene and/or xylenes is introduced through the gas port at the top of the reactor to the granular catalyst bed. The gaseous products of the de-alkylation comprising benzene, hydrogen and unchanged alkylbenzenes are removed from the gas port or ports at the bottom of the reactor preferably by a circumferential channel as hereinbefore described. Another hydrogenation process in which the reactor of the present invention may advantageously be employed is the selective hydrogenation of pyrolytic gasolines over a non-precious metal catalyst to yield a stable high octane gasoline or a source of light aromatics such as benzene, toluene and xylenes. Typically such a process operates at 14 to 28 atmospheres pressure and temperatures between 200° C. and 400° C. the feedstock being a mixture of pyrolysis gasoline (boiling for example in the range 38° C. to 200° C.) and hydrogen.

The present invention may also be used in the steam reforming of naphtha to produce a mixture of nitrogen and hydrogen for ammonia synthesis. In such a process for example a mixture of naphtha and steam undergoes an endothermic reaction over a catalyst at 700 to 900° C. suitably in a reactor constructed in accordance with the present invention to give a mixture of carbon monoxide, carbon dioxide, hydrogen and residual hydrocarbon. In a secondary reforming stage the product from this primary reaction is passed with air over a catalyst again contained in a reactor constructed in accordance with the present invention at a temperature of 800–1100° C. to give a mixture of nitrogen, hydrogen, carbon dioxide and steam. The carbon dioxide and steam are removed to leave the desired mixture of nitrogen and hydrogen. In a variation of the steam reforming process in which reactors according to the present invention may be used naphtha is first reacted with steam at a somewhat lower temperature of 350 to 600° C. to yield a gas rich in methane which is then subjected to a secondary reforming stage.

A further use of the present invention is in the production of a coal gas replacement by reacting steam, naphtha, hydrogen and oxides of carbon between 550 and 750° C. over a catalyst to yield a gas rich in methane and hydrogen.

I claim:
1. A reactor adapted to contain a solid catalyst comprising, in combination,
   (a) a generally vertically disposed reaction chamber having a convergent lower part,
   (b) means at the bottom of the reaction chamber for discharging catalyst,
   (c) a gas port at the top of the reaction chamber,
   (d) an inner refractory lining within said reaction chamber,
   (e) a channel in said refractory lining extending at least partly around the lower part of said reaction chamber,
   (f) means provided in said channel at at least one point for gas flow via said channel, and
   (g) a gas-permeable cover covering said channel.
2. A reactor according to claim 1 wherein said reaction chamber has a cross-sectional diameter of 5 to 50 feet.
3. A reactor according to claim 1 in which the gas permeable cover comprises a number of interlocking fire-resistant bars resting transversely on shoulders formed in the channel.
4. A reactor according to claim 1 which comprises an outer jacket adapted to contain a liquid coolant.
5. A reactor according to claim 1 in which said catalyst discharge means is located on the longitudinal axis of said reaction chamber and comprises an extension piece which is associated with the bottom of said reaction chamber and which has substantially the same cross-sectional area as the bottom of said reaction chamber.
6. A reactor according to claim 5 in which the extension piece is closed by a bolted cover plate.

References Cited

UNITED STATES PATENTS

| | | | |
|---|---|---|---|
| 1,892,742 | 1/1933 | Walter et al. | 23—288.9UX |
| 2,518,842 | 8/1950 | Weber | 23—284 |
| 2,715,565 | 8/1955 | McKay | 23—284X |
| 2,733,137 | 1/1956 | Swaine et al. | 23—284X |
| 2,782,107 | 2/1957 | Inman | 23—288 |
| 3,008,810 | 11/1961 | Pardiso et al. | 23—288 |
| 3,227,527 | 1/1966 | Heinze et al. | 23—288 |
| 3,275,405 | 9/1966 | Clark | 23—284X |

JOSEPH SCOVRONEK, Primary Examiner

B. S. RICHMAN, Assistant Examiner

U.S. Cl. X.R.

23—284; 261—96